US011731711B2

(12) United States Patent
Uno et al.

(10) Patent No.: US 11,731,711 B2
(45) Date of Patent: Aug. 22, 2023

(54) VEHICLE FRONT STRUCTURE

(71) Applicant: MAZDA MOTOR CORPORATION, Hiroshima (JP)

(72) Inventors: Shunsuke Uno, Hiroshima (JP); Seiji Odan, Hiroshima (JP); Kei Ikeda, Hiroshima (JP); Satoshi Okamoto, Hiroshima (JP); Yosuke Morikawa, Hiroshima (JP); Akihiro Nakata, Hiroshima (JP); Masafumi Aburame, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/711,263

(22) Filed: Apr. 1, 2022

(65) Prior Publication Data

US 2022/0324523 A1    Oct. 13, 2022

(30) Foreign Application Priority Data

Apr. 13, 2021  (JP) .................................. 2021-067800

(51) Int. Cl.
  *B62D 35/02*  (2006.01)
  *B62D 35/00*  (2006.01)
(52) U.S. Cl.
  CPC ........... *B62D 35/02* (2013.01); *B62D 35/005* (2013.01)
(58) Field of Classification Search
  CPC ....... B62D 35/005; B62D 35/02; B62D 37/02
  USPC ........................................... 296/180.1, 180.2
  See application file for complete search history.

(56) References Cited

U.S. PATENT DOCUMENTS

| 10,124,838 | B2 * | 11/2018 | Shibutake | ............. B62D 35/02 |
| 11,059,528 | B2 * | 7/2021 | Nakamura | ........... B62D 35/005 |
| 2015/0274224 | A1 * | 10/2015 | Ito | ........................ B62D 25/18 |
| | | | | 296/180.1 |
| 2020/0207427 | A1 * | 7/2020 | Nakata | ................... B62D 35/02 |
| 2020/0207428 | A1 | 7/2020 | Nakata et al. | |

FOREIGN PATENT DOCUMENTS

| DE | 102015001039 A1 * | 8/2015 | ............ B62D 25/08 |
| DE | 102020128057 A1 * | 4/2022 | |
| JP | 2020-104576 A | 7/2020 | |

* cited by examiner

*Primary Examiner* — Jason S Daniels
(74) *Attorney, Agent, or Firm* — Studebaker & Brackett PC

(57) ABSTRACT

A vehicle front structure is provided for preventing a vortex from being generated between high-speed air separated from an outer edge of a deflector and low-speed air in a front wheel house due to a wind speed difference. Embodiments include a deflector disposed in front of a front wheel house projected downward from a lower surface of a bumper face. The deflector includes an air introducing section to introduce air into a space inside the deflector in a front portion of the deflector; and an intermediate-speed wind generating hole section that communicates with the air introducing section and generates an airflow at an intermediate wind speed, lower than a wind speed of air separated from deflector outer edges and higher than a wind speed of air in the front wheel house, in an area not opposing a tire in a vehicle front view of a portion immediately behind the deflector.

11 Claims, 11 Drawing Sheets

VEHICLE FRONT STRUCTURE

TECHNICAL FIELD

The present disclosure relates to a vehicle front structure that includes, at a position in front of a front wheel house, a deflector projected downward from a lower surface of a front bumper face.

BACKGROUND

Conventionally, a vehicle front structure that is provided with a deflector (in detail, a front tire deflector) for a purpose of improving aerodynamic performance has been known. At a position in front of a front wheel house, the deflector is projected downward from a lower surface of a front bumper face.

However, during travel of a vehicle, a high-speed airflow that is separated from an outer edge of the deflector attempts to flow into a space with a low-speed, low-pressure airflow in the front wheel house and generates a vortex, which degrades the aerodynamic performance.

A deflector has been disclosed in JP-A-2020-104576 including an air introducing section that is opened to a vehicle front side and is used to introduce air into an internal space of the deflector during forward travel of the vehicle; a guide section that directs the air, which has been introduced into the internal space from the air introducing section, to a vehicle rear side and an outer side in a vehicle width direction within the internal space; and an outer hole section that is opened to the vehicle rear side in an area opposing a tire and through which the air in the internal space is discharged obliquely to the outer side in the vehicle width direction toward the vehicle rear side.

In the conventional structure disclosed in JP-A-2020-104576, it is possible to suppress high-speed travel wind, which is separated from an outer rear edge of the front bumper face, from flowing into the front wheel house from outside of the front wheel house.

However, in this conventional structure, it is impossible to suppress high-speed under-floor travel wind, which is separated from the outer edge of the deflector, from flowing into the front wheel house from a lower side and an inner side in the vehicle width direction of the front wheel house.

SUMMARY

In order to solve the above problem, the present disclosure provides a vehicle front structure capable of suppressing a vortex from being generated between high-speed air separated from an outer edge of a deflector and low-speed air in a front wheel house due to a wind speed difference.

A vehicle front structure according to the present disclosure includes, at a position in front of a front wheel house, a deflector projected downward from a lower surface of a front bumper face. The deflector includes an air introducing section, through which air is introduced into a space inside the deflector, in a front portion of the deflector; and an intermediate-speed wind generating hole section generating an airflow at an intermediate wind speed, which is lower than a wind speed of air separated from a deflector outer edge and higher than a wind speed of air in the front wheel house, in an area not opposing a tire in a vehicle front view of a portion immediately behind the deflector.

The above-described deflector outer edge includes a bottom surface section of the deflector and a lateral surface section on an inner side in a vehicle width direction of the deflector.

With the above configuration, an airflow at the intermediate wind speed (intermediate-speed wind), which flows out of the intermediate-speed wind generating hole section, is generated between a space in a high-speed area of the air separated from the deflector outer edge and a space in a low-speed area of the air in the front wheel house in an up-down direction.

For this reason, a speed difference between the wind speed in the high-speed area and the wind speed in the low-speed area is reduced, and generation of a vortex can be suppressed. Thus, energy loss is improved.

In other words, during travel of a vehicle, the intermediate-speed wind can suppress the high-speed airflow, which is separated from the deflector outer edge, from flowing into the space with a low-speed, low-pressure airflow in the front wheel house from a vehicle lower side and the inner side in the vehicle width direction, and the generation of the vortex can thereby be suppressed.

In an aspect of the present disclosure, in a rear surface portion of the deflector, the intermediate-speed wind generating hole section is formed in a shape that follows the deflector outer edge.

With the above configuration, since the intermediate-speed wind generating hole section follows the deflector outer edge of the rear surface portion of the deflector, the intermediate-speed wind is generated along the deflector outer edge. As a result, it is possible to efficiently suppress the high-speed flow, which is separated from the outer edge, from flowing into the space in the front wheel house by the intermediate-speed wind.

In an aspect of the present disclosure, the rear surface portion of the deflector has a substantially rectangular shape in a vehicle rear view, and the intermediate-speed wind generating hole section is formed in an L-shape by including a corner of a lower inner portion in the vehicle width direction of the rear surface portion.

With the above configuration, it is possible to generate the airflow at the intermediate wind speed in the simple configuration.

In an aspect of the present disclosure, the deflector includes a guide section that is provided inside the deflector and guides the air introduced from the air introducing section to the intermediate-speed wind generating hole section; and an outer hole section, through which the air introduced from the air introducing section is discharged obliquely to an outer side in the vehicle width direction toward a vehicle rear side, in an area opposing a tire in the vehicle front view of the portion immediately behind the deflector. A front end of the guide section is located behind the air introducing section and between a vehicle width direction inner end portion and a vehicle width direction outer end portion.

With the above configuration, it is possible to divide the air introduced from the air introducing section into a flow toward the intermediate-speed wind generating hole section and a flow toward the outer hole section by the guide section.

The air that is discharged obliquely to the outer side in the vehicle width direction from the above-described outer hole section flows toward the outer side in the vehicle width direction of the tire. In this way, it is possible to suppress wind, which is separated from an outer rear edge of the front bumper face, from being caught in the front wheel house from outside of the front wheel house.

In short, it is possible to suppress high-speed under-floor travel wind, which is separated from the deflector outer edge, from flowing into the front wheel house from a lower side and an inner side in the vehicle width direction thereof and to suppress a vehicle body lateral surface flow, which is separated from the outer rear edge of the front bumper face, from flowing into the front wheel house from the outer side in the vehicle width direction.

In an aspect of the present disclosure, the guide section extends in a vehicle front-rear direction, and a rear end thereof is located between the outer hole section and the intermediate-speed wind generating hole section in the vehicle width direction.

With this configuration, it is possible to deflect the airflow inside the deflector and thereby reliably guide the wind introduced from the air introducing section to the outer hole section and the intermediate-speed wind generating hole section.

The present disclosure is capable of suppressing a vortex from being generated between the high-speed air separated from the deflector outer edge and the low-speed air in the front wheel house due to a wind speed difference.

DETAILED DESCRIPTION

A purpose of suppressing a vortex from being generated between high-speed air separated from an outer edge of a deflector and low-speed air in a front wheel house due to a wind speed difference is achieved by a vehicle front structure that is configured to include, at a position in front of the front wheel house, a deflector projected downward from a lower surface of a front bumper face and in which the deflector includes an air introducing section, through which air is introduced into a space inside the deflector, in a front portion of the deflector; and an intermediate-speed wind generating hole section that generates an airflow at an intermediate wind speed, which is lower than a wind speed of air separated from the deflector outer edge and higher than a wind speed of air in the front wheel house, in an area not opposing a tire in a vehicle front view of a portion immediately behind the deflector.

A detailed description will hereinafter be made on an embodiment of the present disclosure with reference to the drawings.

Figure 1:
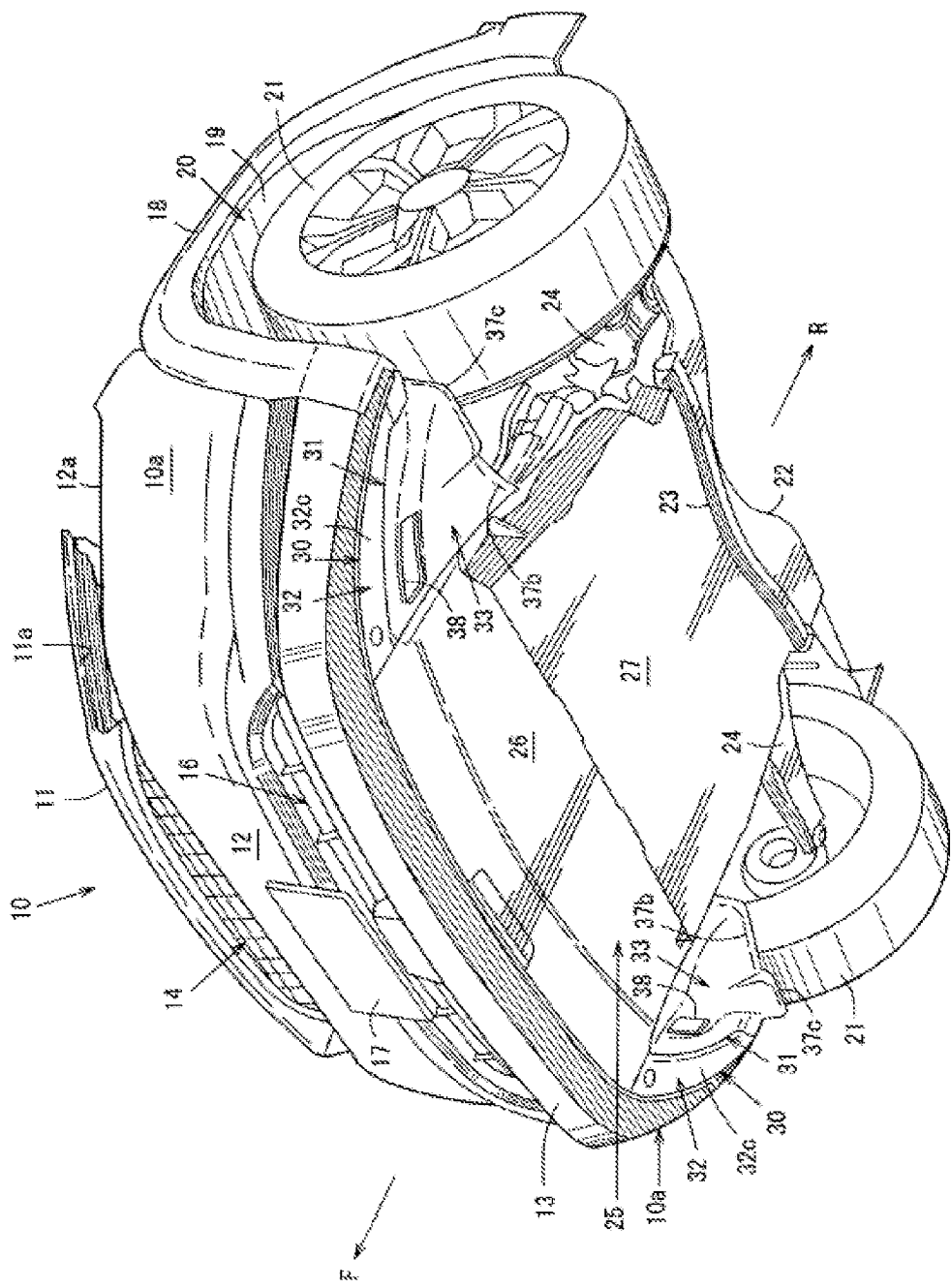
FIG. 1 is an upward perspective view of a vehicle that includes a front structure according to the present disclosure.
Figure 2:
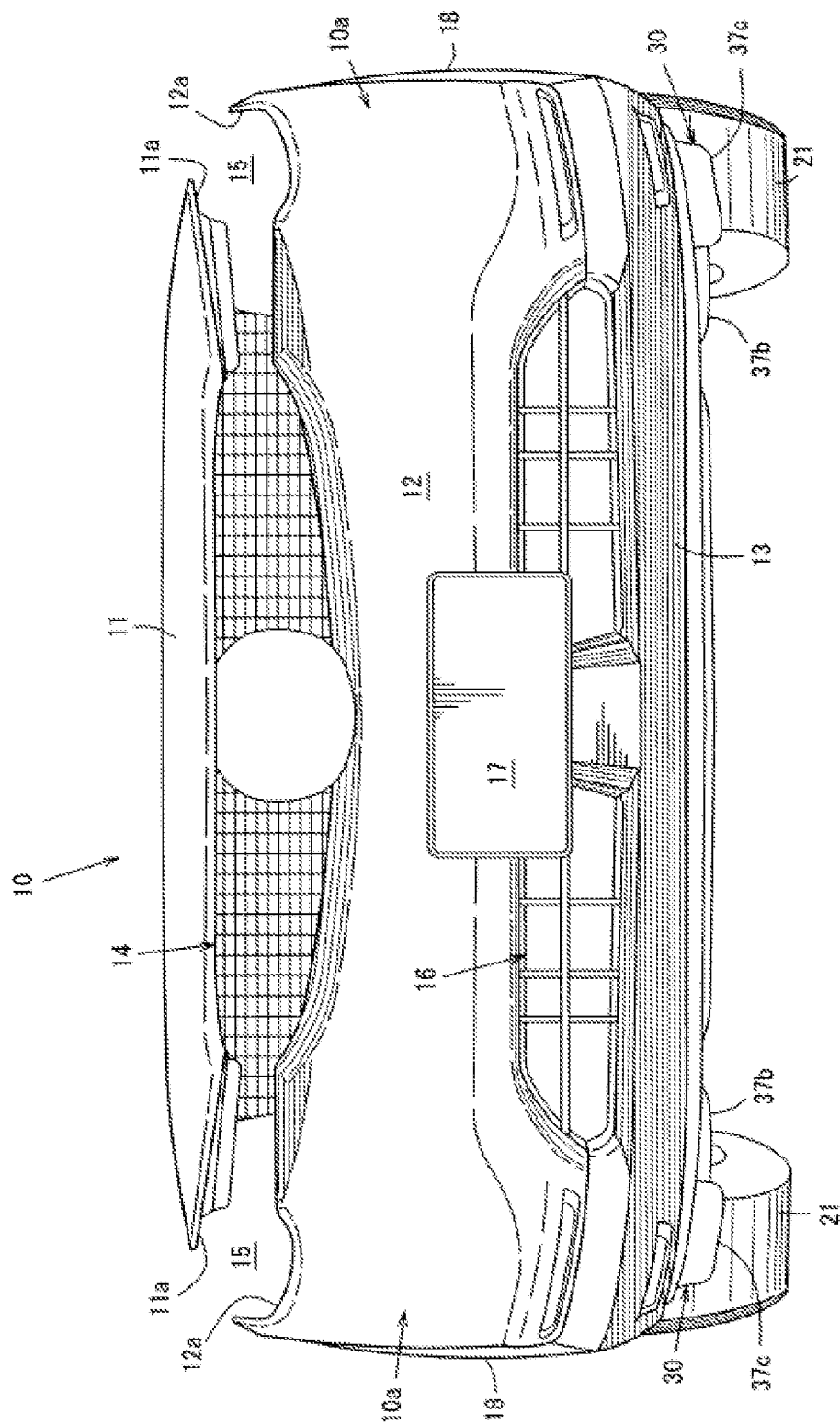
FIG. 2 is a front view of FIG. 1.
Figure 3:
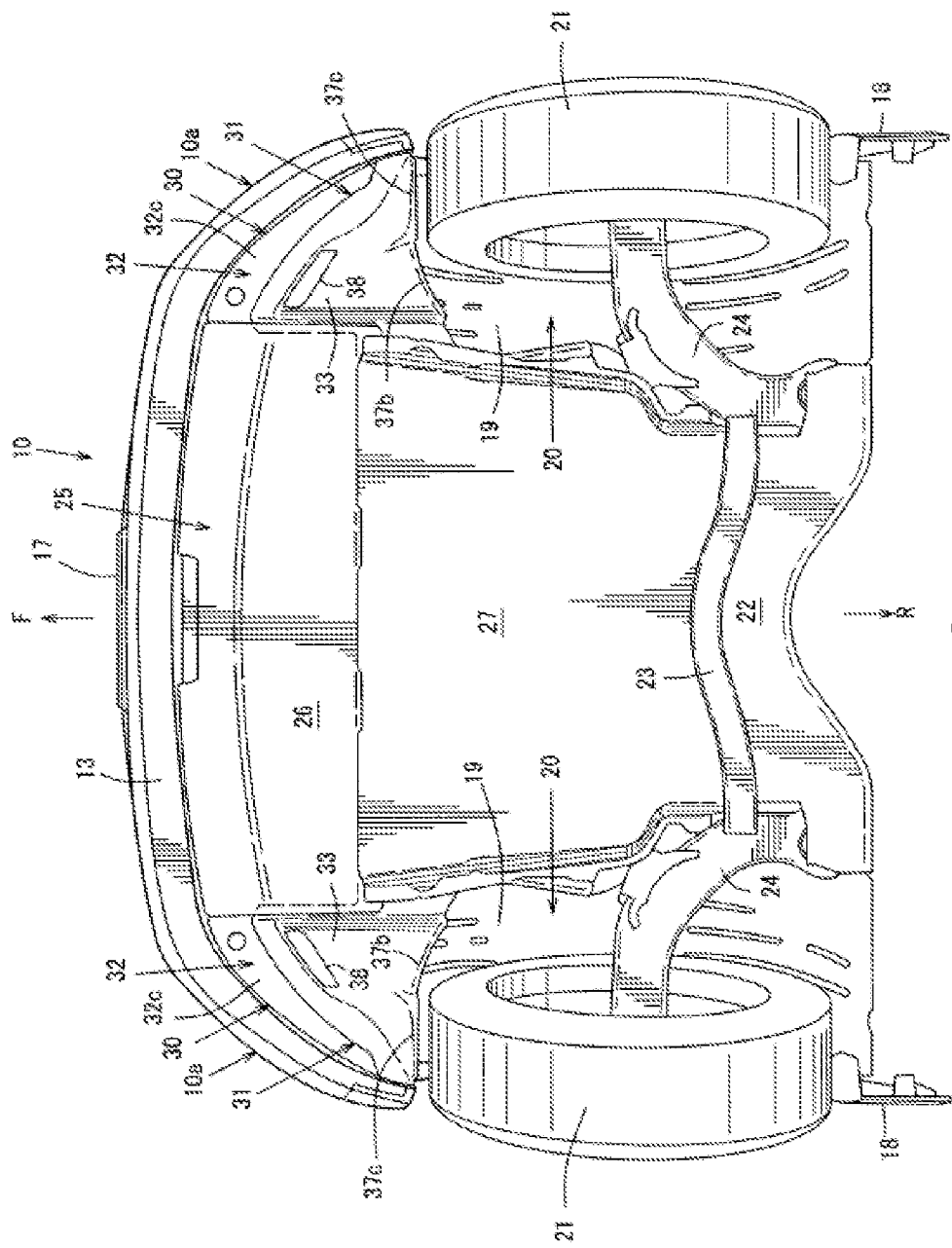
FIG. 3 is a bottom view of FIG. 1.
Figure 4:
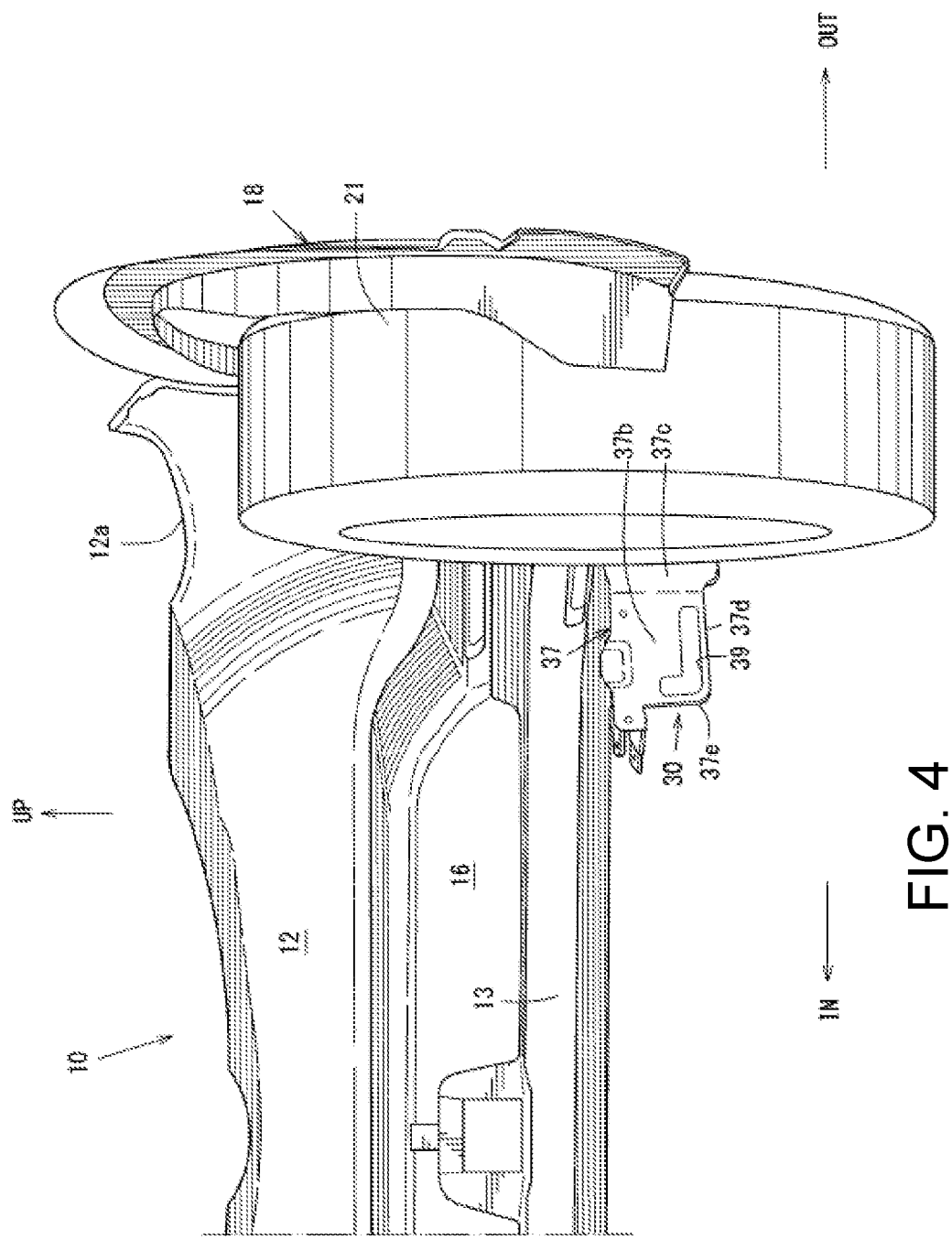
FIG. 4 is a back view illustrating a state where a main section on a vehicle right side is seen from a vehicle rear side.

The drawings illustrate a vehicle front structure. FIG. 1 is an upward perspective view illustrating a state where a vehicle including the vehicle front structure is seen from below. FIG. 2 is a front view of FIG. 1. FIG. 3 is a bottom view of FIG. 1. FIG. 4 is a back view illustrating a state where a main section on a right side of the vehicle is seen from a vehicle rear side.

In the drawings, an arrow F indicates a vehicle front direction, an arrow R indicates a vehicle rear direction, an arrow OUT indicates an outer side in a vehicle width direction, an arrow IN indicates an inner side in the vehicle width direction, and an arrow UP indicates a vehicle up direction.

An engine compartment located in a front portion of the vehicle is openably/closably covered with a hood. Right and left portions of the engine compartment are respectively covered with a right and left pair of front fender panels, and a front portion of the engine compartment is covered with a front bumper face 10, which is illustrated in FIG. 1 to FIG. 4.

As illustrated in FIG. 2, the above-described front bumper face 10 has an upper front bumper face section 11, an intermediate front bumper face section 12, and a lower front bumper face section 13. A front grille 14 is arranged between the upper front bumper face section 11 and the intermediate front bumper face section 12.

As illustrated in FIG. 3, each of right and left portions of the above-described front bumper face 10 in the vehicle width direction is bent in a curved shape toward a vehicle rear side and an inner side in the vehicle width direction. As illustrated in FIG. 1 and FIG. 2, in this bent section 10a, the upper front bumper face section 11 is formed with a recessed section 11a that is recessed upward, and the intermediate front bumper face section 12 is formed with a recessed section 12a that is recessed downward.

By these upper and lower recessed sections 11a, 12a, a headlamp arrangement space 15 is provided (see FIG. 2).

In addition, as illustrated in FIG. 2, in a front portion of the front bumper face 10, a travel wind introducing port 16 is formed between the intermediate front bumper face section 12 and the lower front bumper face section 13 described above.

Furthermore, as illustrated in FIG. 1 and FIG. 2, a license plate 17 is attached to a front center portion in the vehicle width direction of a boundary between the intermediate front bumper face section 12 and the lower front bumper face section 13 described above.

Moreover, as illustrated in FIG. 1, an overfender 18 is provided across an outer end portion in the vehicle width direction of a front wheel house 20 in the front fender panel and bent end portions of the intermediate front bumper face section 12 and the lower front bumper face section 13.

As illustrated in FIG. 1 and FIG. 3, in the above-described front wheel house 20, a vehicle outer surface that opposes a tire 21 is provided with a mudguard 19. The above-described tire 21 constitutes a front wheel.

As illustrated in FIG. 3, a subframe 22 as a suspension crossmember is provided in a lower portion of the engine compartment. This subframe 22 is reinforced with a gusset 23. On each side of the subframe 22 in the vehicle width direction, a lower arm 24 as a suspension arm is provided to suspend the front wheel (see the tire 21) in cooperation with an upper arm, which is not illustrated.

As illustrated in FIG. 1 and FIG. 3, an undercover 25 that covers the engine compartment from below is provided between the right and left front wheel houses 20, 20. This undercover 25 is formed to be divided into a front undercover 26 and a rear undercover 27. Both of these undercovers 26, 27 cover a portion between a lower surface of the lower front bumper face section 13 and the subframe 22 in a vehicle front-rear direction.

As illustrated in FIG. 1 and FIG. 3, the above-described front bumper face 10 is located on a vehicle front side of the front wheel house 20 and includes a right and left pair of deflectors 30 at positions in front of the front wheel houses 20. Each of the deflectors 30 is projected downward from the lower front bumper face section 13 in the front bumper face 10.

Figure 5:
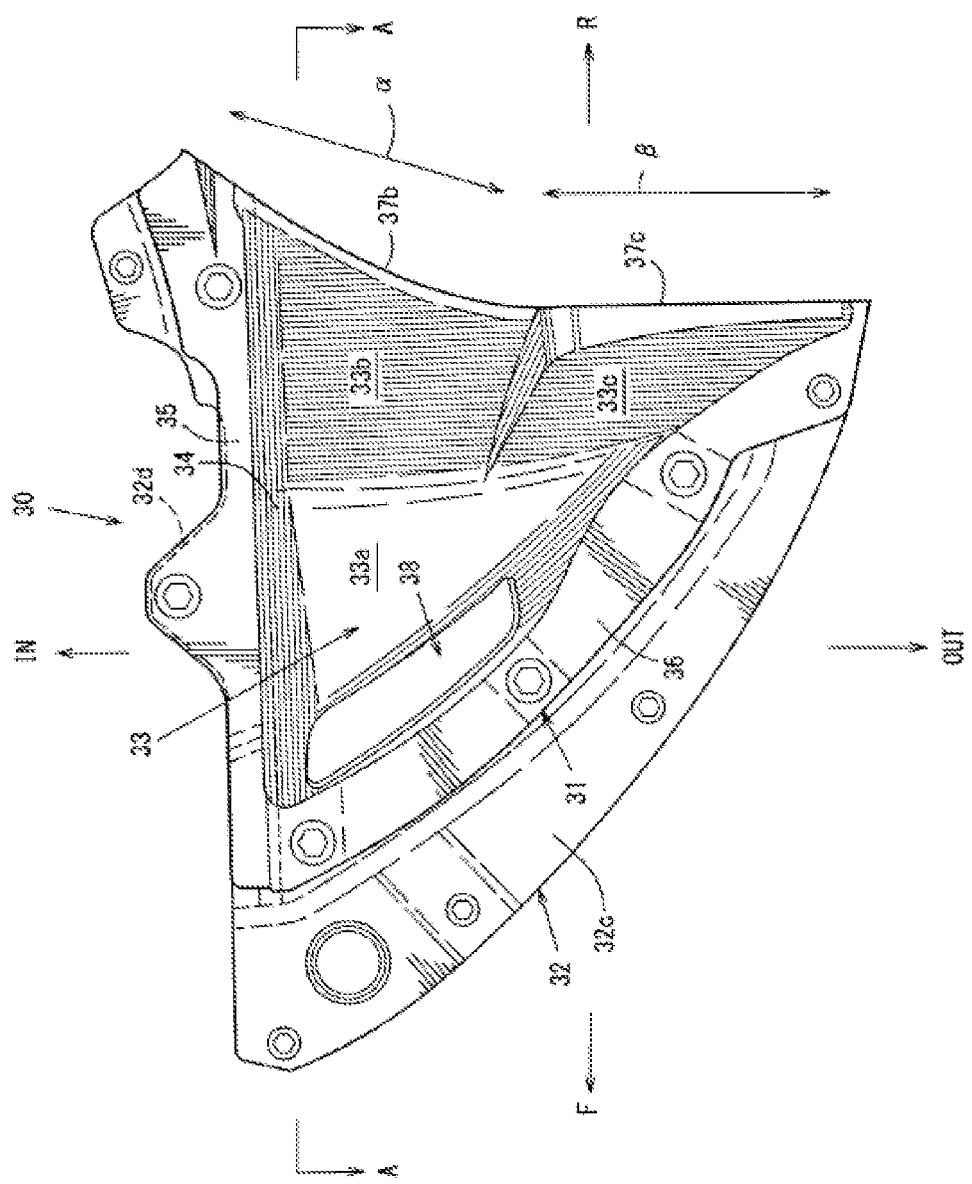
FIG. 5 is a bottom view of a deflector.
Figure 6:
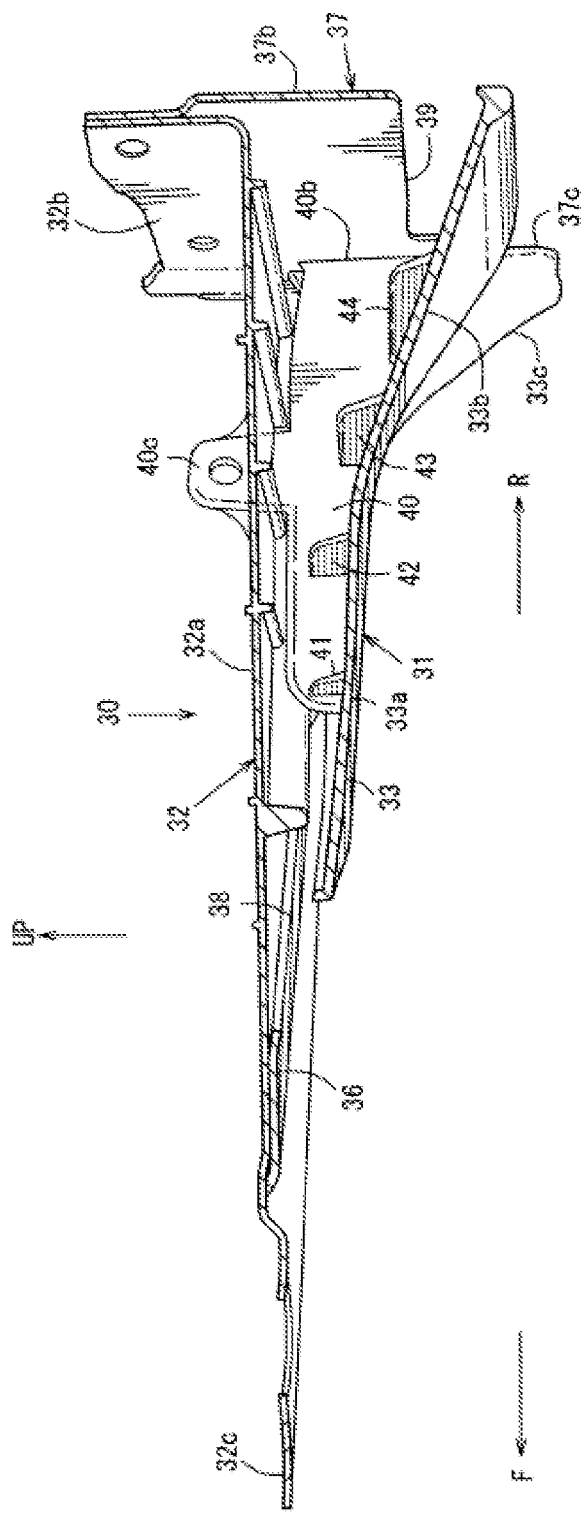
FIG. 6 is a cross-sectional view that is taken along arrow A-A in FIG. 5.
Figure 7:
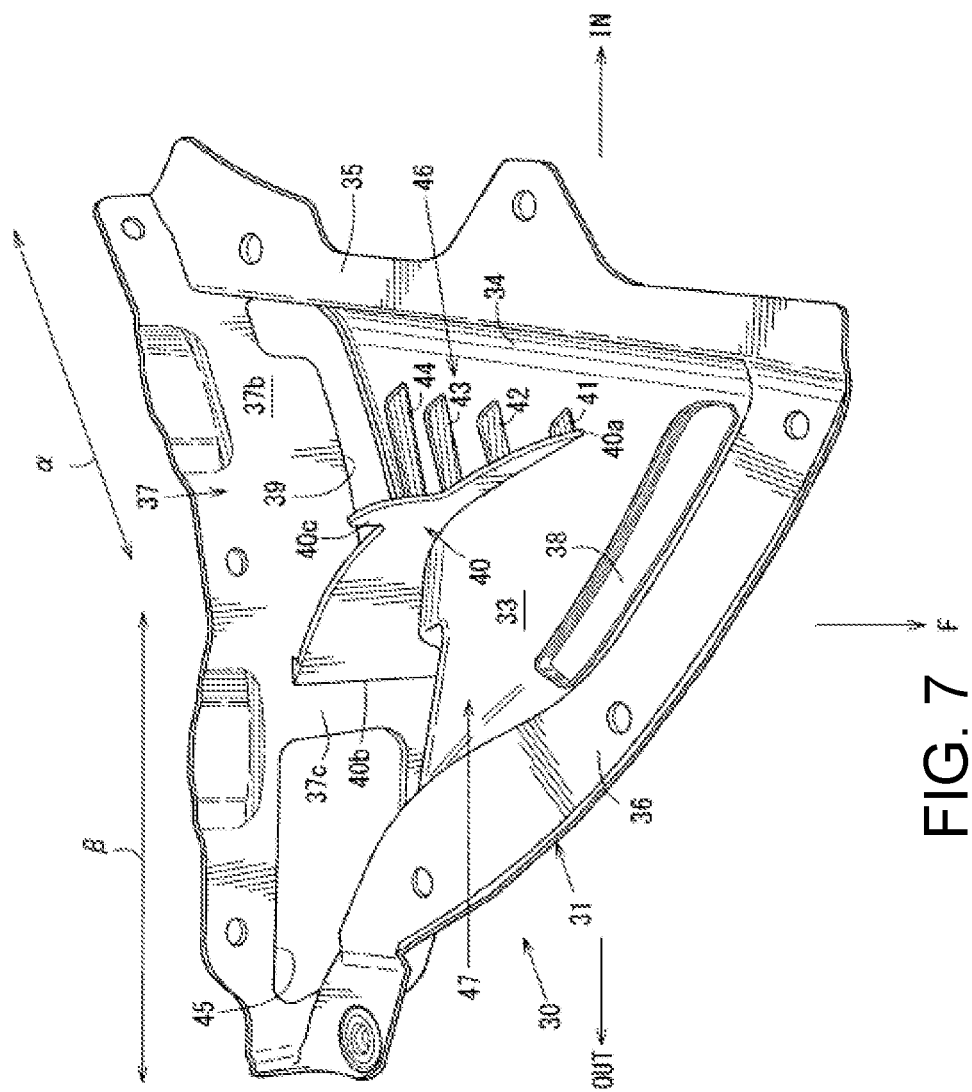
FIG. 7 is a perspective view illustrating a state where the deflector is seen from a vehicle front side and a vehicle upper side.
Figure 8:
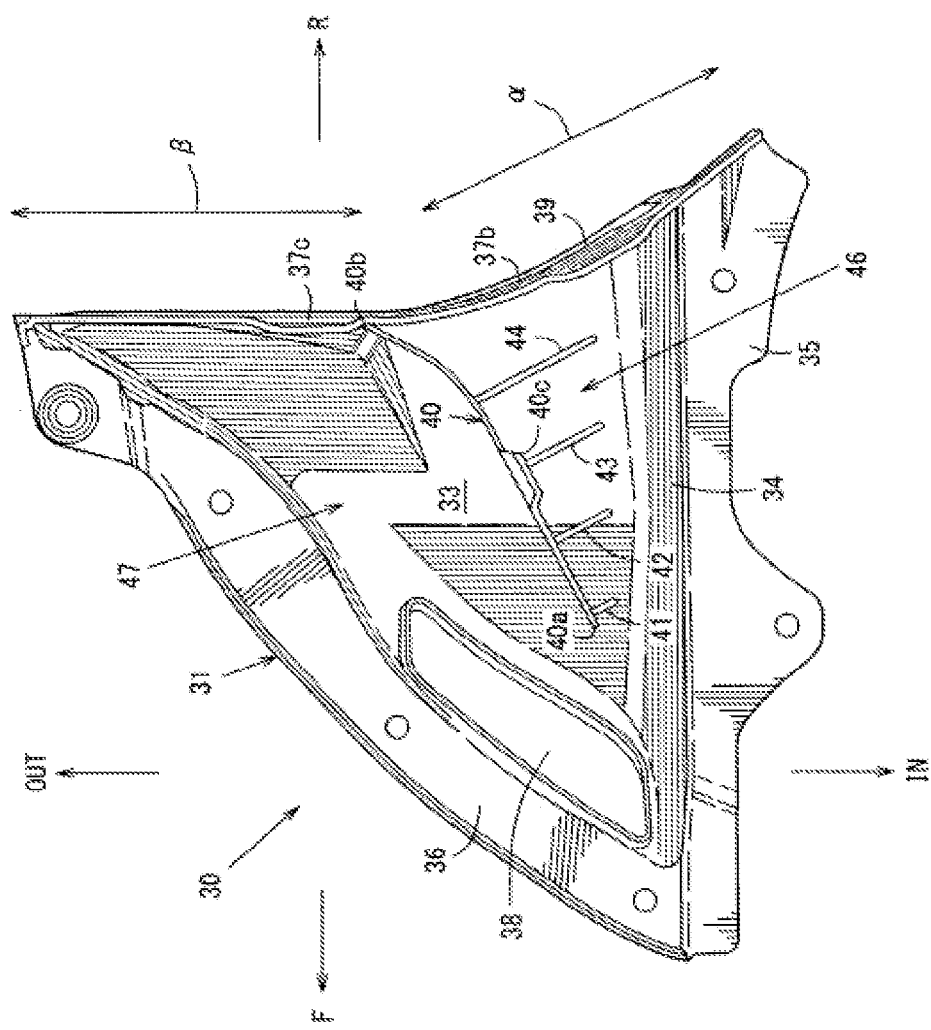
FIG. 8 is a plan view of the deflector.
Figure 9:
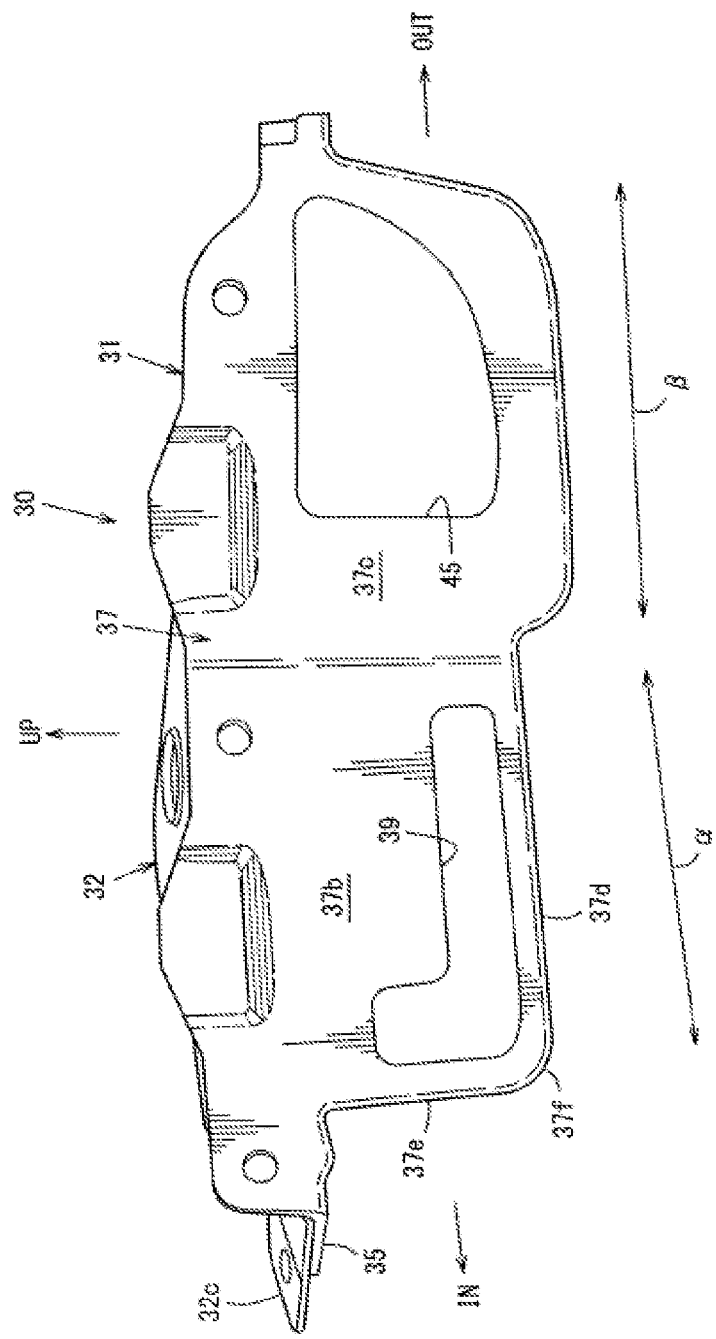
FIG. 9 is a back view of the deflector.
Figure 10:
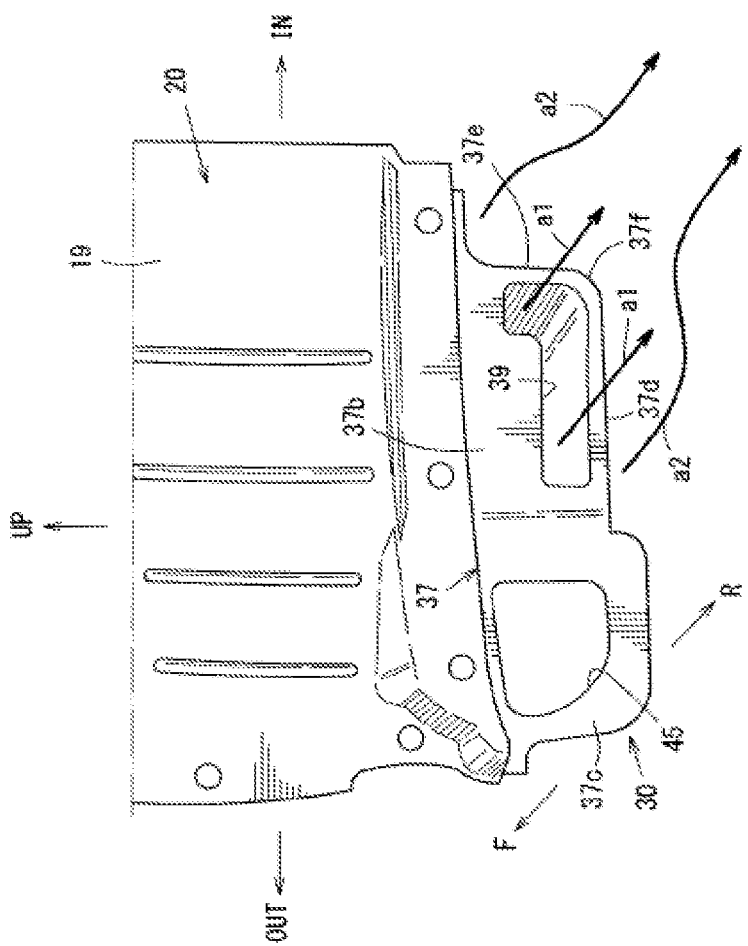
FIG. 10 is an explanatory view for explaining action by an airflow at an intermediate wind speed.
Figure 11:
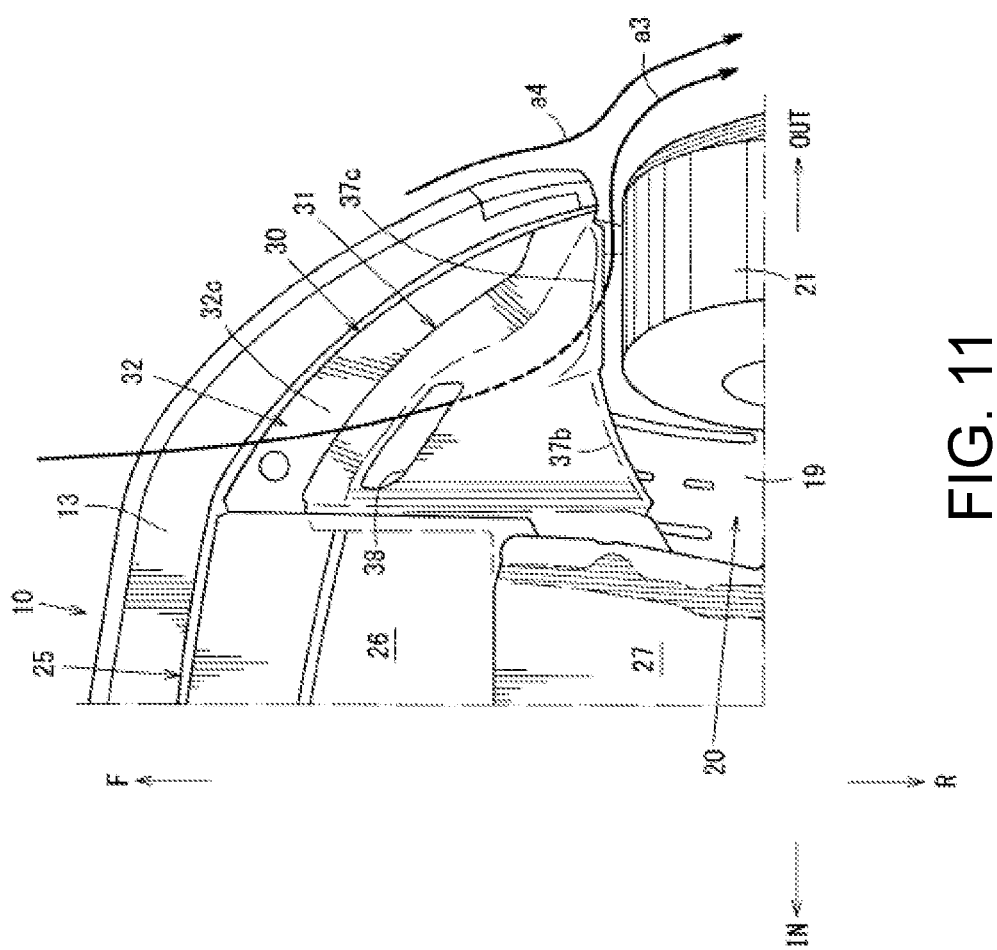
FIG. 11 is an explanatory view for explaining action by the airflow that is discharged obliquely to an outer side in a vehicle width direction.

FIG. 5 is a bottom view of the deflector 30. FIG. 6 is a cross-sectional view that is taken along arrow A-A in FIG. 5. FIG. 7 is a perspective view illustrating a state where the deflector 30 is seen from the vehicle front side and a vehicle upper side. FIG. 8 is a plan view of the deflector 30. FIG. 9 is a back view of the deflector 30. FIG. 10 is an explanatory view for explaining action by an airflow at an intermediate wind speed. FIG. 11 is an explanatory view for explaining action by the airflow that is discharged obliquely to an outer side in the vehicle width direction.

In this embodiment, as illustrated in the bottom view in FIG. 3, the right and left pair of the above-described deflectors 30 is provided between two each of a rear side of a bent portion of the lower front bumper face section 13, a front side of the tire 21, and a lateral side in the vehicle width direction of the undercover 25. These right and left deflectors 30, 30 are formed to be bilaterally symmetrical or substantially bilaterally symmetrical.

As illustrated in FIG. 6, the above-described deflector 30 is formed to include a deflector body 31 as a lower member and an upper member 32 that covers an upper opening of this deflector body 31. While both of the deflector body 31 and the upper member 32 are illustrated in FIG. 5, FIG. 6, and FIG. 9, only the deflector body 31 is illustrated in FIG. 7 and FIG. 8.

As illustrated in FIG. 7 and FIG. 8, the deflector body 31 includes: a bottom wall 33; an inner flange section 35 that is coupled to the bottom wall 33 from the inner side in the vehicle width direction via a vertical wall 34; a front outer flange section 36 that is provided on a front side and an outer side in the vehicle width direction of the bottom wall 33; and a rear wall 37 that is located in a rear end portion of the bottom wall 33. The deflector body 31 is formed in a substantially triangular shape in a vehicle plan view.

As illustrated in FIG. 6, the above-described bottom wall 33 includes: a front inclined section 33a whose portion on the vehicle rear side is inclined downward with a gentle slope of approximately 6 degrees with respect to a main surface section 32a of the upper member 32; an inner inclined section 33b whose portion on the vehicle rear side is inclined downward with a slope of approximately 22 degrees with respect to the main surface section 32a; and an outer inclined section 33c whose portion on the vehicle rear side is inclined downward with a steep slope of approximately 52 degrees with respect to the main surface section 32a. Here, the angle indicating a degree of inclination of each of the above-described slopes is not limited to the above numerical value.

As illustrated in FIG. 9, the above-described rear wall 37 includes: an inner rear wall section 37b that corresponds to the inner inclined section 33b and thus has a relatively small vertical dimension; and an outer rear wall section 37c that corresponds to the outer inclined section 33c and thus has a relatively large vertical dimension.

As illustrated in FIG. 6, the upper member 32 includes: the main surface section 32a that closes the entire upper opening of the deflector body 31; and a rear wall section 32b that rises upward from a rear end of this main surface section 32a. In addition, as illustrated in FIG. 5 and FIG. 6, the upper member 32 includes a front outer flange section 32c that is integrally provided on a front side and an outer side in the vehicle width direction of the above-described main surface section 32a. Here, the above-described main surface section 32a substantially extends in a horizontal direction.

As indicated by a dotted line in FIG. 5, the above-described upper member 32 includes an inner flange section 32d, which extends in a vehicle front-rear direction, on an inner side in the vehicle width direction of the main surface section 32a.

The inner flange section 35 of the deflector body 31 is fixed in contact with the inner flange section 32d of the upper member 32, the front outer flange section 36 of the deflector body 31 is fixed in contact with a specified portion of the main surface section 32a (a front outer portion of the main surface section 32a) along the front outer flange section 32c of the upper member 32, and an upper portion of the rear wall 37 of the deflector body 31 is fixed in contact with a back surface of the rear wall section 32b of the upper member 32. In this way, the deflector 30 is formed in a hollow shape (see FIG. 5 and FIG. 6).

As illustrated in FIG. 6 and FIG. 7, in a front portion of the above-described deflector 30, the deflector 30 includes an air introducing section 38, through which air is introduced into a space inside the deflector 30.

In detail, the air introducing section 38, through which under-floor travel wind is introduced into an internal space of the deflector 30, is formed in a front portion of the front inclined section 33a, which is a portion immediately behind the front outer flange section 36 of the deflector body 31. This air introducing section 38 is opened in a vehicle front-down direction, and the air introducing section 38 is formed in an elongated shape along the front outer flange section 36.

In addition, as illustrated in FIG. 6, FIG. 7, and FIG. 9, the deflector 30 includes an intermediate-speed wind generating hole section 39 that communicates with the air introducing section 38 and generates an airflow at an intermediate wind speed (intermediate-speed wind a1, see FIG. 10).

In detail, in an area α that does not oppose the tire 21 in a vehicle front view of a portion immediately behind the deflector 30, the above-described intermediate-speed wind generating hole section 39 is formed to be opened to the inner rear wall section 37b in the rear wall 37 of the deflector body 31.

Intermediate-speed wind generating hole section 39 is a hole section that generates the airflow at the intermediate wind speed (the intermediate-speed wind a1). The wind speed of such an airflow is lower than a wind speed of the air (high-speed separation wind a2, see FIG. 10) separated from a deflector bottom surface section 37d (see FIG. 9) and a lateral surface section 37e (see FIG. 9) on the inner side in the vehicle width direction of the deflector, both of which serve as an outer edge of the deflector 30, and is higher than a wind speed of the air in the front wheel house 20.

In this way, as illustrated in FIG. 10, the deflector of this embodiment is configured to generate the airflow at the intermediate wind speed (the intermediate-speed wind a1), which flows out of the intermediate-speed wind generating hole section 39, between a space in a high-speed area of the air (the high-speed separation wind a2) separated from the bottom surface section 37d and the lateral surface section 37e as the deflector outer edge and a space in a low-speed area of the air in the front wheel house 20 in the up-down direction.

The deflector of this embodiment is configured such that a speed difference between the wind speed in the high-speed area (the wind speed of the high-speed separation wind a2)

and the wind speed in the low-speed area within the front wheel house 20 is consequently reduced, which improves energy loss and suppresses generation of a vortex.

In other words, the deflector of this embodiment is configured that, during travel of the vehicle, the intermediate-speed wind a1 suppresses a flow of the high-speed air (the high-speed separation wind a2), which is separated from the outer edge of the above-described deflector 30, from flowing into the space with the low-speed, low-pressure airflow in the front wheel house 20 from the vehicle lower side and the inner side in the vehicle width direction, and the generation of the vortex is thereby suppressed.

In the case where the intermediate-speed wind generating hole section 39 does not exist, the speed difference between the high-speed airflow, which is separated from the deflector outer edge, and the low-speed, low-pressure airflow in the front wheel house, that is, between the wind speed in the high-speed area and the wind speed in the low-speed area becomes significant. Due to this significant speed difference, the energy loss is increased on the inner side in the vehicle width direction of the tire at the position behind the deflector, which consequently generates the vortex and degrades aerodynamic performance.

On the contrary, in this embodiment, the intermediate-speed wind a1 suppresses the flow of the high-speed separation wind a2 from flowing into the space in the low-speed area within the front wheel house 20. In this way, the generation of the vortex is suppressed, and the aerodynamic performance is improved.

In addition, as illustrated in FIG. 9, in a rear surface portion of the deflector 30, the above-described intermediate-speed wind generating hole section 39 is formed in a shape that follows the outer edge of the deflector 30.

In detail, as illustrated in FIG. 9, in the inner rear wall section 37b of the rear wall 37 in the deflector body 31, the intermediate-speed wind generating hole section 39 is formed in a shape that follows the bottom surface section 37d and the lateral surface section 37e as the outer edge of the deflector 30.

Just as described, the intermediate-speed wind generating hole section 39 follows the deflector outer edge of the rear surface portion of the deflector 30, and the intermediate-speed wind a1 is generated along the deflector outer edge. In this way, it is configured to efficiently suppress the high-speed flow (the high-speed separation wind a2), which is separated from the outer edge (the bottom surface section 37d and the lateral surface section 37e), from flowing into the space in the front wheel house 20.

Furthermore, as illustrated in FIG. 9, the rear wall 37 as the rear surface portion of the deflector 30 is formed in a substantially rectangular shape in a vehicle rear view, and the above-described intermediate-speed wind generating hole section 39 is formed in an L-shape by including a corner 37f of a lower inner portion in the vehicle width direction of the inner rear wall section 37b in the rear wall 37.

Just as described, the intermediate-speed wind generating hole section 39 is formed in the L-shape in the vehicle rear view by including the above-described corner 37f. In this way, with the simple configuration, it is possible to generate the flow of the air at the intermediate wind speed (the intermediate-speed wind a1) along the deflector outer edge including the corner 37f, and it is possible to efficiently suppress the high-speed separation wind a2 from flowing into the space in the front wheel house 20.

In detail, the intermediate-speed wind a1, which flows out of a corresponding portion of the intermediate-speed wind generating hole section 39, efficiently suppresses the high-speed separation wind a2, which is separated from the bottom surface section 37d in the rear surface portion of the deflector 30, the high-speed separation wind a2, which is separated from the lateral surface section 37e, and the high-speed separation wind a2, which is separated from the corner 37f, from flowing into the space in the front wheel house 20.

As illustrated in FIG. 7 and FIG. 8, the above-described deflector 30 includes a guide section 40 that is provided inside the deflector 30.

This guide section 40 is provided to be projected upward from the bottom wall 33 of the deflector body 31, and a front end 40a of the guide section 40 is located behind the above-described air introducing section 38. In addition, at a position behind the air introducing section 38, the front end 40a of the guide section 40 is located between a vehicle width direction inner end portion and a vehicle width direction outer end portion. Furthermore, a rear end 40b of the guide section 40 is located between the inner rear wall section 37b and the outer rear wall section 37c of the rear wall 37 in the deflector body 31, and is fixed in contact with the rear wall 37. The above-described guide section 40 guides the air, which is introduced from the air introducing section 38, to the intermediate-speed wind generating hole section 39.

As illustrated in a plan view in FIG. 8, the front end 40a of the guide section 40 is located on the inner side in the vehicle width direction from the rear end 40b. In other words, the rear end 40b of the guide section 40 is located on the outer side in the vehicle width direction from the front end 40a, and the guide section 40 is continuously formed between both of these ends 40a, 40b in a manner to connect the front end 40a and the rear end 40b.

In addition, the guide section 40 extends in the vehicle front-rear direction, and the rear end 40b thereof is located between an outer hole section 45 and the intermediate-speed wind generating hole section 39 in the vehicle width direction. In this way, it is possible to deflect the airflow inside the deflector 30 and thereby reliably guide the wind introduced from the air introducing section 38 to the outer hole section 45 and the intermediate-speed wind generating hole section 39.

Furthermore, as illustrated in FIG. 7, the above-described guide section 40 is formed to have a relatively small vertical dimension on the front end 40a side and have a relatively large vertical dimension on the rear end 40b side.

Moreover, as illustrated in FIG. 6 to FIG. 8, a projection piece 40c projected upward is integrally formed in an intermediate portion in the front-rear direction of the above-described guide section 40. As illustrated in FIG. 6, the projection piece 40c is configured to extend upward by penetrating the main surface section 32a of the upper member 32 and to be fastened to the upper member 32.

As illustrated in FIG. 6 to FIG. 8, the bottom wall 33 of the deflector body 31 is integrally formed with plural ribs 41, 42, 43, 44 that couple the bottom wall 33 and the guide section 40. It is configured, by each of these ribs 41 to 44, to secure a vertically standing posture of the above-described guide section 40 and appropriately set the wind speed of the intermediate-speed wind a1 (see FIG. 10).

Furthermore, as illustrated in FIG. 7, FIG. 9, and FIG. 10, in an area β that opposes the tire 21 in the vehicle front view of the portion immediately behind the deflector 30, the outer hole section 45 is formed to be opened in the outer rear wall section 37c of the deflector body 31 in the deflector 30. Through the outer hole section 45, the air introduced from the above-described air introducing section 38 is discharged obliquely to the outer side in the vehicle width direction toward the vehicle rear side.

As illustrated in FIG. 6, the deflector 30 is formed in the hollow shape, and is provided with the air introducing section 38, the intermediate-speed wind generating hole section 39, the outer hole section 45, and the guide section 40 in the deflector body 31. In this way, as illustrated in FIG. 7, a first flow passage 46, which is located on the inner side in the vehicle width direction of the guide section 40, and a second flow passage 47, which is located on the outer side in the vehicle width direction of the guide section 40, are formed inside the deflector 30.

The first flow passage 46 is an airflow passage, through which the air introduced from the air introducing section 38 flows toward the intermediate-speed wind generating hole section 39. The second flow passage 47 is an airflow passage, through which the air introduced from the air introducing section 38 flows toward the outer hole section 45.

By providing the intermediate-speed wind generating hole section 39, the outer hole section 45, and the guide section 40 described above, the air introduced from the air introducing section 38 is divided into a flow toward the intermediate-speed wind generating hole section 39 through the first flow passage 46 and a flow toward the outer hole section 45 through the second flow passage 47.

As illustrated in FIG. 11, the air (deflected wind a3) that is discharged obliquely to the outer side in the vehicle width direction from the above-described outer hole section 45 flows toward the outer side in the vehicle width direction of the tire 21. It is configured to consequently suppress wind (a vehicle body lateral surface flow a4) separated from an outer rear edge of the front bumper face 10 from being caught in the front wheel house 20 from the outside of the front wheel house 20.

In short, the deflector of this embodiment is configured to suppress the high-speed under-floor travel wind (the high-speed separation wind a2), which is separated from the outer edge of the deflector 30, from flowing into the front wheel house 20 from the lower side and the inner side in the vehicle width direction thereof (see FIG. 10) and to suppress the vehicle body lateral surface flow a4, which is separated from the outer rear edge of the front bumper face 10, from flowing into the front wheel house 20 from the outer side in the vehicle width direction (see FIG. 11).

In other words, the above configuration is designed to simultaneously suppress the flow of the high-speed separation wind a2 into the front wheel house 20 and the flow of the vehicle body lateral surface flow a4 into the front wheel house 20.

As it has been described so far in detail, the vehicle front structure in this embodiment is the vehicle front structure that includes, at the position in front of the front wheel house 20, the deflector 30 projected downward from the lower surface of the front bumper face 10. The deflector 30 includes: the air introducing section 38, through which the air is introduced into the space inside the deflector 30, in the front portion of the deflector 30; and the intermediate-speed wind generating hole section 39 that communicates with the air introducing section 38 and, generates the airflow at the intermediate wind speed (the intermediate-speed wind a1) in the area α not opposing the tire 21 in the vehicle front view of the portion immediately behind the deflector 30. The wind speed of the airflow (the intermediate-speed wind a1) is lower than the wind speed of the air (the high-speed separation wind a2) separated from the deflector outer edge (see the bottom surface section 37*d* and the lateral surface section 37*e*), and is higher than the wind speed of the air in the front wheel house 20.

With this configuration, the airflow at the intermediate wind speed (the intermediate-speed wind a1), which flows out of the intermediate-speed wind generating hole section 39, is generated between the space in the high-speed area of the air (the high-speed separation wind a2) separated from the deflector outer edge (the bottom surface section 37*d* and the lateral surface section 37*e*) and the space in the low-speed area of the air in the front wheel house 20 in the up-down direction.

As a result, the speed difference between the wind speed in the high-speed area and the wind speed in the low-speed area is reduced, and the generation of the vortex can be suppressed. Thus, the energy loss is improved.

In other words, during the travel of the vehicle, the intermediate-speed wind a1 can suppress the high-speed airflow (the high-speed separation wind a2), which is separated from the outer edge (the bottom surface section 37*d* and the lateral surface section 37*e*) of the deflector 30, from flowing into the space with the low-speed, low-pressure airflow in the front wheel house 20 from the vehicle lower side and the inner side in the vehicle width direction, and the generation of the vortex can thereby be suppressed.

In addition, in this embodiment of the present disclosure, in the rear surface portion (see the rear wall 37) of the deflector 30, the intermediate-speed wind generating hole section 39 is formed in the shape that follows the outer edge (the bottom surface section 37*d* and the lateral surface section 37*e*) of the deflector 30 (see FIG. 9).

With this configuration, since the intermediate-speed wind generating hole section 39 follows the deflector outer edge (the bottom surface section 37*d* and the lateral surface section 37*e*) of the rear surface portion of the deflector 30, it is possible to efficiently suppress the high-speed flow (the high-speed separation wind a2), which is separated from the outer edge, from flowing into the space in the front wheel house 20.

Furthermore, in this embodiment of the present disclosure, the rear surface portion (the rear wall 37) of the deflector 30 has the substantially rectangular shape in the vehicle rear view, and the intermediate-speed wind generating hole section 39 is formed in the L-shape by including the corner 37*f* of the lower inner portion in the vehicle width direction of the rear surface portion (the rear wall 37) (see FIG. 9).

According to this configuration, it is possible to generate the airflow at the intermediate wind speed (the intermediate-speed wind a1) in the simple configuration.

Moreover, in this embodiment of the present disclosure, the deflector 30 includes: the guide section 40 that is provided inside the deflector 30 and guides the air introduced from the air introducing section 38 to the intermediate-speed wind generating hole section 39; and the outer hole section 45, through which the air introduced from the air introducing section 38 is discharged obliquely to the outer side in the vehicle width direction toward the vehicle rear side, in the area β opposing the tire 21 in the vehicle front view of the portion immediately behind the deflector 30. The front end 40*a* of the guide section 40 is located behind the air introducing section 38 and between the vehicle width direction inner end portion and the vehicle width direction outer end portion (see FIG. 7 and FIG. 11).

With this configuration, it is possible to divide the air introduced from the air introducing section 38 into the flow toward the intermediate-speed wind generating hole section 39 and the flow toward the outer hole section 45 by the guide section 40.

The air (the deflected wind a3) that is discharged obliquely to the outer side in the vehicle width direction from the above-described outer hole section 45 flows toward the outer side in the vehicle width direction of the tire 21. In this way, it is possible to suppress the wind (the vehicle body lateral surface flow a4), which is separated from the outer rear edge of the front bumper face 10, from being caught in the front wheel house 20 from the outside of the front wheel house 20.

In short, it is possible to suppress the high-speed underfloor travel wind (the high-speed separation wind a2), which is separated from the outer edge (the bottom surface section 37d and the lateral surface section 37e) of the deflector 30, from flowing into the front wheel house 20 from the lower side and the inner side in the vehicle width direction thereof and to suppress the vehicle body lateral surface flow a4, which is separated from the outer rear edge of the front bumper face 10, from flowing into the front wheel house 20 from the outer side in the vehicle width direction.

In addition, in this embodiment of the present disclosure, the guide section 40 extends in the vehicle front-rear direction, and the rear end 40b thereof is located between the outer hole section 45 and the intermediate-speed wind generating hole section 39 in the vehicle width direction.

With this configuration, it is possible to deflect the airflow inside the deflector 30 and thereby reliably guide the wind introduced from the air introducing section 38 to the outer hole section 45 and the intermediate-speed wind generating hole section 39.

In the above-described embodiment, the rear surface portion of the deflector in the present disclosure corresponds to the rear wall 37 of the deflector 30 in the embodiment. Similarly, the deflector outer edge corresponds to the bottom surface section 37d and the lateral surface section 37e of the deflector 30. However, the present disclosure is not limited only to the configuration in the above-described embodiment.

As it has been described so far, the present disclosure is useful for the vehicle front structure that includes the deflector projected downward from the lower surface of the front bumper face at the position in front of the front wheel house.

What is claimed is:

1. A vehicle front structure that includes a deflector projected downward from a lower surface of a front bumper face at a position in front of a front wheel house, wherein the deflector includes:
   an air introducing section, through which air is introduced into a space inside the deflector, in a front portion of the deflector; and
   an intermediate-speed wind generating hole section that communicates with the air introducing section and generates an airflow at an intermediate wind speed in an area not opposing a tire in a vehicle front view of a portion immediately behind the deflector, the wind speed of the airflow being lower than a wind speed of air separated from a deflector outer edge and higher than a wind speed of air in the front wheel house.

2. The vehicle front structure according to claim 1, wherein
   in a rear surface portion of the deflector, the intermediate-speed wind generating hole section has a shape that follows the deflector outer edge.

3. The vehicle front structure according to claim 2, wherein
   a rear surface portion of the deflector has a substantially rectangular shape in a vehicle rear view, and
   the intermediate-speed wind generating hole section has an L-shape including a corner of a lower inner portion in a vehicle width direction of the rear surface portion.

4. The vehicle front structure according to claim 3, wherein
   the deflector includes:
   a guide section inside the deflector which guides the air introduced from the air introducing section to the intermediate-speed wind generating hole section; and
   an outer hole section, through which the air introduced from the air introducing section is discharged obliquely to an outer side in the vehicle width direction toward a vehicle rear side, in an area opposing the tire in the vehicle front view of the portion immediately behind the deflector, and
   at a position behind the air introducing section, a front end of the guide section is located between a vehicle width direction inner end portion and a vehicle width direction outer end portion.

5. The vehicle front structure according to claim 4, wherein
   the guide section extends in a vehicle front-rear direction, and a rear end thereof is located between the outer hole section and the intermediate-speed wind generating hole section in the vehicle width direction.

6. The vehicle front structure according to claim 4, wherein a rear end of the guide section is located closer to the outer side in the vehicle width direction than the front end of the guide section, and the guide section is continuously formed between the front end and the rear end of the guide section to connect the front end and the rear end of the guide section.

7. The vehicle front structure according to claim 4, wherein the front end of the guide section has a smaller vertical dimension than a rear end of the guide section.

8. The vehicle front structure according to claim 4, wherein
   the deflector includes a deflector body as a lower member, and an upper member which covers an upper opening of the deflector body; and
   the guide section includes a projection piece projecting upward in an intermediate portion of the guide section in the front-rear direction of the guide section, the projection piece extending upward to penetrate a main surface section of the upper member of the deflector, the projection piece being fastened to the upper member of the deflector.

9. The vehicle front structure according to claim 2, wherein
   the deflector includes:
   a guide section inside the deflector which guides the air introduced from the air introducing section to the intermediate-speed wind generating hole section; and
   an outer hole section, through which the air introduced from the air introducing section is discharged obliquely to an outer side in the vehicle width direction toward a vehicle rear side, in an area opposing the tire in the vehicle front view of the portion immediately behind the deflector, and
   at a position behind the air introducing section, a front end of the guide section is located between a vehicle width direction inner end portion and a vehicle width direction outer end portion.

10. The vehicle front structure according to claim 1, wherein the deflector includes:

a guide section inside the deflector which guides the air introduced from the air introducing section to the intermediate-speed wind generating hole section; and an outer hole section, through which the air introduced from the air introducing section is discharged obliquely to an outer side in the vehicle width direction toward a vehicle rear side, in an area opposing the tire in the vehicle front view of the portion immediately behind the deflector, and at a position behind the air introducing section, a front end of the guide section is located between a vehicle width direction inner end portion and a vehicle width direction outer end portion.

11. The vehicle front structure according to claim 10, wherein the guide section extends in a vehicle front-rear direction, and a rear end thereof is located between the outer hole section and the intermediate-speed wind generating hole section in the vehicle width direction.

* * * * *